Figure 1:
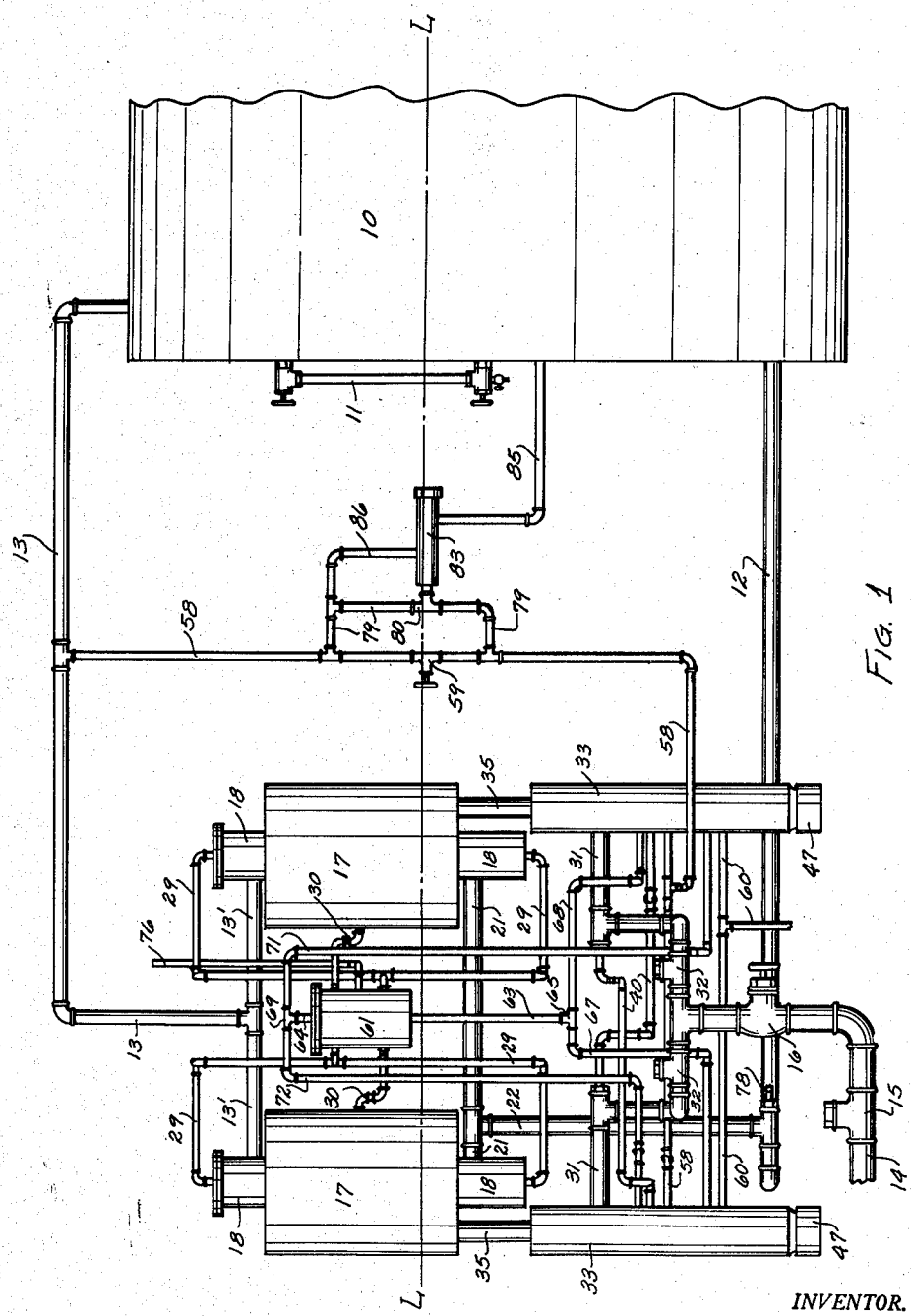

Aug. 22, 1950     T. N. PINION     2,519,600
BOILER WATER FEED DEVICE
Filed May 13, 1946     6 Sheets-Sheet 1

INVENTOR.
THOMAS N. PINION
BY
ATTORNEY

Aug. 22, 1950     T. N. PINION     2,519,600
BOILER WATER FEED DEVICE
Filed May 13, 1946     6 Sheets-Sheet 3
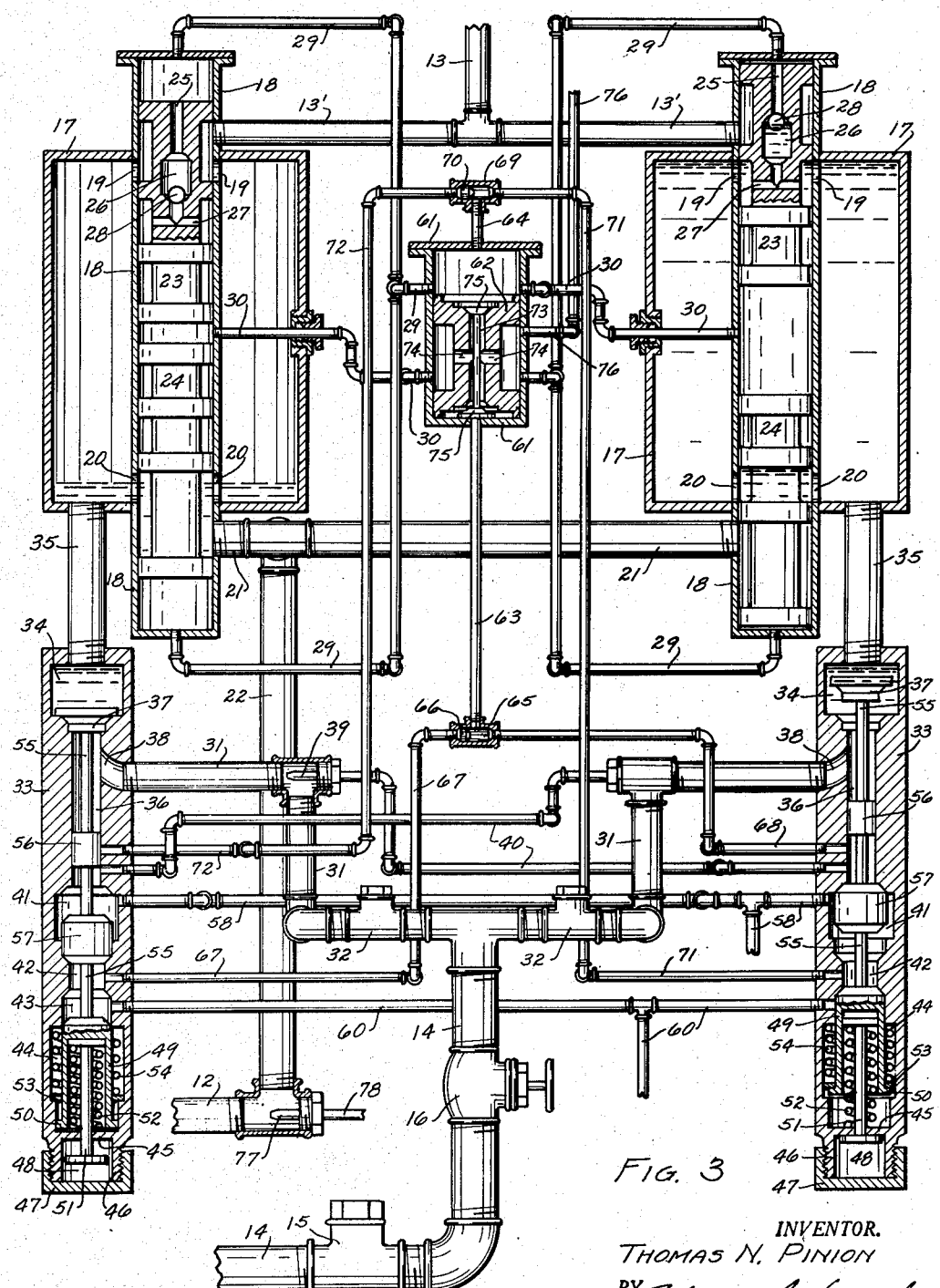
Fig. 3
INVENTOR.
THOMAS N. PINION
BY 
ATTORNEY Aug. 22, 1950 — T. N. PINION — 2,519,600
BOILER WATER FEED DEVICE
Filed May 13, 1946 — 6 Sheets-Sheet 4

INVENTOR.
THOMAS N. PINION
BY
ATTORNEY

INVENTOR.
THOMAS N. PINION
BY
ATTORNEY

Patented Aug. 22, 1950

2,519,600

UNITED STATES PATENT OFFICE 2,519,600

BOILER WATER FEED DEVICE

Thomas N. Pinion, Denver, Colo.

Application May 13, 1946, Serial No. 669,386

15 Claims. (Cl. 137—101)

This invention relates to means and apparatus for the maintenance of constant liquid level in steam boilers and analogous pressure-generating units, and has as an object to provide an improved unitary assembly connectible between a boiler and a source or supply of feed water and automatically responsive to boiler water level fluctuations to maintain said level at a predetermined relation with the boiler.

A further object of the invention is to provide an improved boiler water feed and liquid level control device automatically effective to deliver low-pressure feed water supply interiorly and against the working pressure of a steam boiler in proportion to the boiler water requirements.

A further object of the invention is to provide an improved boiler water feed and liquid level control device automatically effective to pressure-balance a supply of feed water in gravity-flow relation with a boiler served thereby.

A further object of the invention is to provide an improved boiler water feed and liquid level control device automatically effective for the development and continuous maintenance of a supply of feed water in pressure-balanced, gravity-flow relation with a working boiler.

A further object of the invention is to provide an improved boiler water feed and liquid level control device energized for automatic actuation by steam from the boiler served thereby.

A further object of the invention is to provide an improved boiler water feed and liquid level control device arranged for self-actuation from inoperative condition in response to adventitious, potentially-hazardous lowering of water level in an unattended boiler.

A further object of the invention is to provide an improved boiler water feed and liquid level control device adapted to function for the delivery of feed water of varying temperature and supply pressure characteristics.

A further object of the invention is to provide an improved boiler water feed and liquid level control device that is simple and relatively inexpensive of construction and operative installation, susceptible of practical development in a variety of specific adaptations largely through the use of standard and available material, that is positive and efficient in fully automatic operation, durable in use, economical of power, and free from onerous maintenance requirements.

With the foregoing and other objects in view, my invention consists in the construction, arrangement, and combination of elements hereinafter set forth, pointed out in my claims, and illustrated by the accompanying drawings, in which—

Figure 2:
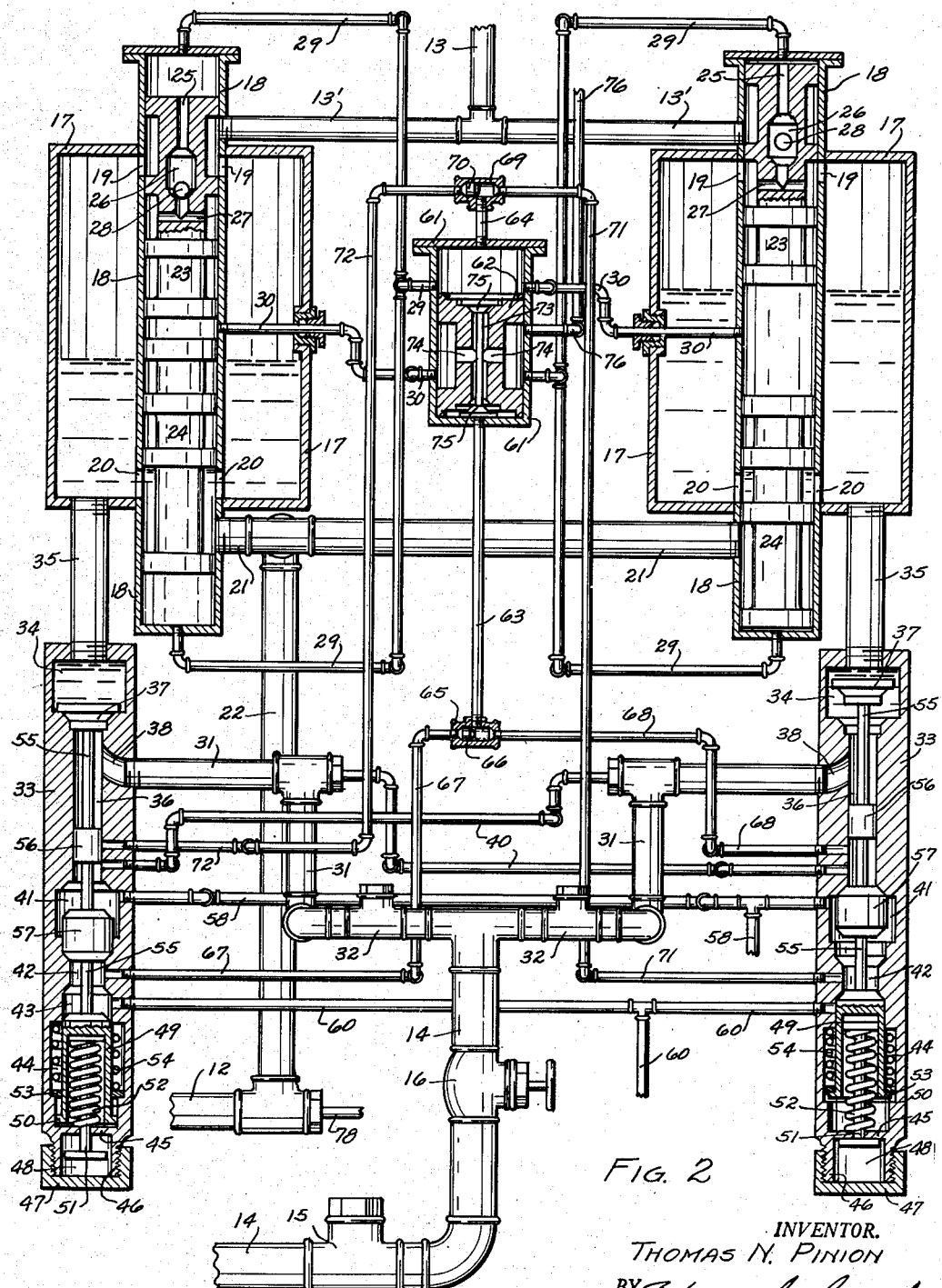
Figure 4:
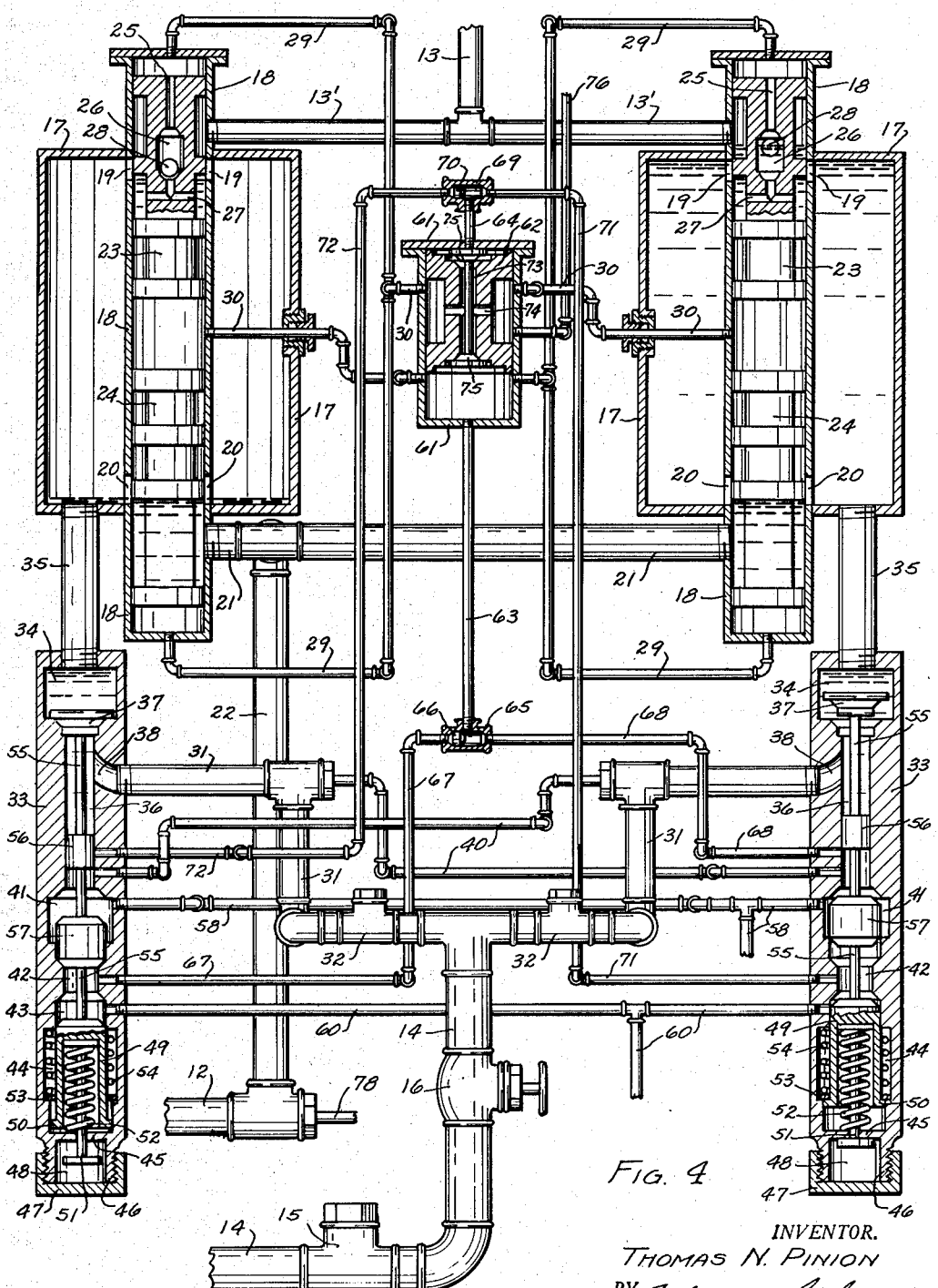
Figure 5:
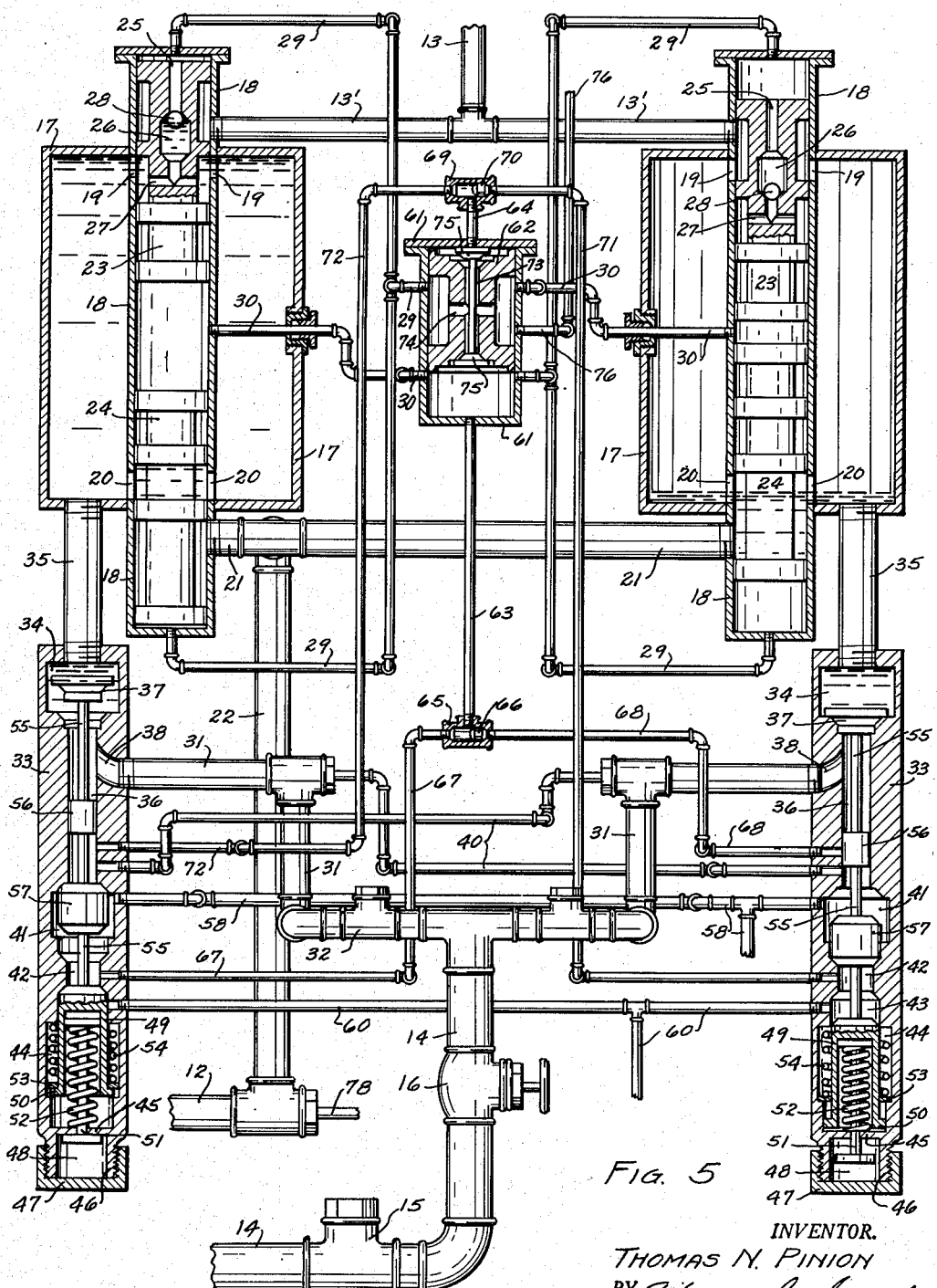
Figure 6:
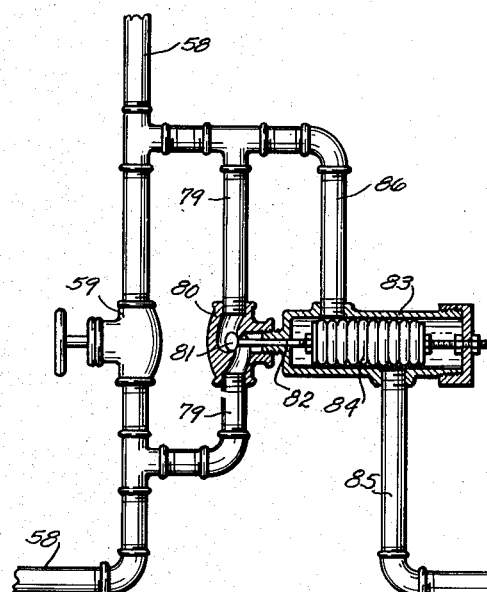
Figure 6:
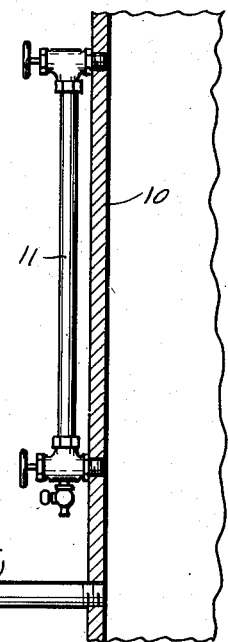
Figure 7:
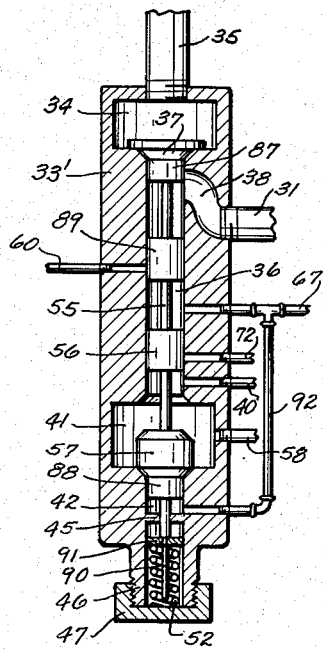
Figure 8:
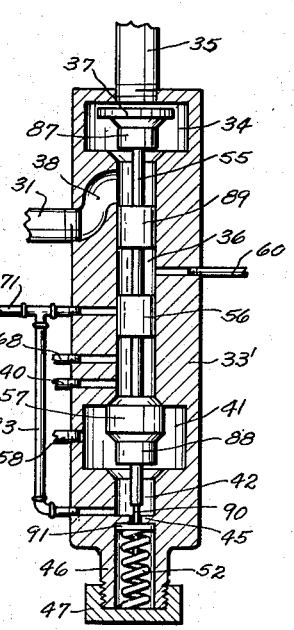
Figure 9:
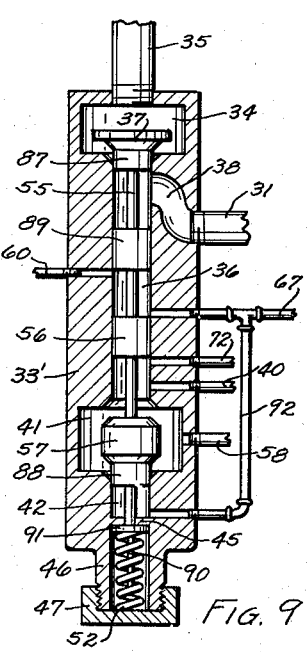

Figure 1 is a conventionalized, diagrammatic view of a representative embodiment of the invention as operatively associated with a typical boiler. Figure 2 is an enlarged elevation of the improved device according to Figure 1, certain elements and sub-assemblies of the combination being shown in axial section to illustrate the relative positions of movable elements characteristic of one phase of cyclic unit operation. Figure 3 is a view similar to Figure 2 illustrating certain of the assembly movable elements as positioned for a subsequent phase of the operative cycle. Figure 4 is a view similar to Figures 2 and 3 illustrating the assembly movable elements in the relationships thereby assumed during a still later phase of the operative cycle. Figure 5 is a view similar to Figures 2, 3 and 4 illustrating the relative positions assumed by the assembly movable elements in a final phase of the operative cycle. Figure 6 is a fragmentary, detail elevation, partly in section, of automatic water feed unit actuating means protectively included in the operative association of such unit with a boiler. Figures 7 and 8 are similar sections taken axially through complementary sub-assemblies alternatively employable in substitution for functionally-equivalent agencies of the assembly as illustrated in the preceding views. Figure 9 is a view similar to Figure 7 depicting movable elements of the latter showing in an intermediate position within their range of actuation.

In the construction of the improvement as shown, the numeral 10 designates a conventional boiler, of any specific type, having the usual water level sight glass 11, a desired operating water level indicated by the line L—L, a water input line 12 communicating with the boiler below the indicated water level thereof, and a steam flow line 13 communicating with and leading from any suitable point of said boiler where steam under boiler operating pressure is available. A water supply line in communication with and leading from any suitable source or supply of feed water, heated or unheated, is indicated at 14 and is shown as equipped with a check-valve 15 to inhibit reverse flow therethrough and with a manually-operable flow control valve 16, as is usual practice; the water source or supply serving said line 14 being understood as being arranged to deliver water to and through said line under gravity or otherwise induced pressures sufficient to maintain an adequate flow and to effect delivery thereof against normal atmospheric pressure to the pertinent elements of the assembly hereinafter described.

The improvement includes a plurality, in this instance two, of sealed, pressure-resistant, preferably cylindrical, identical reservoirs 17 similarly disposed and fixedly supported in spaced, axially vertical and parallel relation with their lower end closures slightly below the horizontal plane including the water level line L—L, said reservoirs being of size and capacity suitably proportioned to the water needs of the boiler served thereby. Each of the reservoirs 17 is traversed by an axially-coincident, tubular member 18 which intersects, is sealed through, and extends axially beyond the end closures of the associated reservoir to define an annular chamber within such reservoir wherewith the interior of the related member is in communication through ports 19 intersecting the member wall inwardly adjacent the reservoir upper end closure and through like ports 20 intersecting the member wall inwardly adjacent the reservoir lower end closure. The opposite ends of each member 18 exterior to its reservoir 17 are suitably closed against escape of working pressures from the member interior, and branches 13' of the steam flow line 13 operatively connect with the member 18 upward extensions immediately above the reservoir 17 upper ends, for feed of steam interiorly of said member upper ends, while outflow lines 21 operatively connect with the member 18 lower extensions immediately below the reservoir 17 lower ends for flow communication, through a common riser 22, between said member lower ends and the input line 12 serving the boiler.

Each of the tubular members 18 slidably houses a pair of similar, opposed, spool-type valve elements reciprocable axially thereof, the upper of said valve elements being designated by the numeral 23 and the lower of said elements by the numeral 24. The said valve elements 23 and 24 are each integral units comprising a cylindrical body portion of less diameter than the tubular member bore and four annular, concentric ribs spaced apart along said body portion and of a size to fit closely within and slidably cooperate with the member bore, two of said annular ribs being at the respective ends of the body portion and the other two ribs of each element being spaced apart intermediate said end ribs. As is common practice, the annular ribs of the valve elements 23 and 24 may be equipped with packing rings, of any desired type and construction, cooperable with the member bore to minimize leakage past said ribs and along the bore wall. The annular ribs of the lower valve element 24 are so spaced axially of the element body portion as to define an annular chamber about said element body portion lower end and between the outer end and next inwardly adjacent one of the annular ribs of an axial length sufficient to span over and simultaneously communicate with the ports 20 and outflow line 21 of its member 18 when said element is at the inner limit of its range of reciprocation axially of said member, thereby establishing a passage for outflow of liquid from the reservoir 17, through the ports 20 and valve element lower annular chamber, to the associated line 21, and so proportioned to the length of the member 18 lower extension as to dispose the rib inwardly limiting said body portion lower annular chamber in passage-interrupting relation with the member bore wall between said ports 20 and outflow line 21 when the said element 24 is at the outer limit of its range of reciprocation as determined by engagement of the element outer end against the corresponding member 18 closed end. Similarly, the annular ribs of the upper valve element 23 are so spaced axially of the element body portion as to define an annular chamber about said element body portion upper end and between the outer end and next inwardly adjacent one of the annular ribs of an axial length sufficient to span over and simultaneously communicate with the ports 19 and steam line branch 13' of its member 18 when said element is at the inner limit of its range of reciprocation axially of said member, thereby establishing a passage for inflow of steam to the reservoir 17, and so proportioned to the length of the member 18 upper extension as to dispose the rib inwardly limiting said body portion upper annular chamber in passage-interrupting relation with the member bore wall between said ports 19 and steam branch line 13' when the said element 23 is at the outer limit of its range of reciprocation as determined by engagement of the element outer end against the corresponding member 18 closed end. Additionally, each element 23 is formed with an axial bore 25 intersecting its outer end and communicating, through an enlargement or chamber 26, with radial bores 27 opening through the element body portion wall between the intermediate pair of element annular ribs and hence into the annular chamber of said element disposable in communication with the ports 19 when said element is at the outer limit of its range of reciprocation, said chamber 26 operatively accommodating a flotable ball 27, or equivalent device, arranged for alternative closing cooperation with the bore 26 ends oppositely serving said chamber and hence functioning as a check valve, in a manner and for the purposes hereinafter set forth. With the valve element construction and arrangement shown and above described, provision is made for selectively controlling communication through the member 18 with the associated reservoir 17 interior, simultaneous shifting of the opposed elements 23 and 24 to the inner limit of their range of reciprocation in a given member 18, which relationship is shown at the left of Figure 2, serving to establish and maintain an inflow passage from the steam branch line 13' through the valve element 23 outer annular chamber and ports 19 to the reservoir 17 interior and an outflow passage from said reservoir though the ports 20 and element 24 outer annular chamber to the line 21, while simultaneous shifting of said elements to the outer limit of their range of actuation, and to the relationship shown at the right of Figure 2, serves to operatively close off the passages above traced and inhibit flow access to the reservoir interior therethrough.

Selective, simultaneous positioning of the elements 23 and 24 in and relative to a given member 18 is accomplished by means of steam pressure from the boiler 10 deliverable, under controls hereinafter to be described, alternatively to the midportion and to the outer ends of said member, the illustrated embodiment of the improvement including a branched pressure flow line 29 simultaneously serving both ends of each member 18 and a separate pressure flow line 30 sealed through the related reservoir 17 outer wall and communicating with the member 18 bore between the adjacent ends of the elements 23 and 24 therein, so that pressure flow to the member 18 through the line 29, the line 30 being open to atmospheric pressure, acts to position and maintain the elements 23 and 24 responsive to said flow at the inner limit of their range of reciprocation, while pressure flow to said member through the line 30, the line 29 being open at atmospheric pressure, acts to position and maintain said elements 23 and 24 in maximum separation at the outer limit of their range of actuation.

In a direction of flow beyond the valve 16, the water supply line 14 communicates with and serves branches 31, one for each of the reservoirs 17, each of which branches leads through a conventional check valve 32 inhibitive of reverse flow through the branch to delivery communication interiorly and adjacent the upper end of a control valve housing 33. A control valve housing 33 is provided in association with and beneath each reservoir 17, and each said housing is formed with a multi-chamber, vertical bore whereof an upper chamber compatment 34 is connected by means of a nipple 35 directly with its reservoir 17, preferably through the bottom closure of the latter. The compartment 34 is located above the connection of the branch 31 with the housing 33 and is a radial enlargement of the vertical housing bore 36, with which latter the bottom of said compartment communicates through a tapered throat constituting a seat for sealing cooperation with a conical valve 37 reciprocable altitudinally of the housing within the compartment 34, an upwardly-directed inflow passage 38 connecting through the housing 33 wall between the input end of the branch 31 and the bore 36 just beneath the seated position of the valve 37, so that when said valve is elevated away from its seat, and only atmospheric pressure obtains in the associated reservoir 17, water delivered through the branch 31 may traverse the passage 38, bore 36 upper end, compartment 34, and nipple 35 to enter and charge the reservoir, while closing of said valve 37 against its seat acts to inhibit such flow. Upward inclination of the passage 38 serves to preserve velocity of inflow from the branch 31 and also to direct such inflow against the under surface of the valve 37, thereby subjecting said valve to inflow pressure tending to unseat said valve and open the flow passage to the reservoir. To supplement the inflow pressure acting through the branches 31, each of said branches is operatively equipped with a steam jet 39, conventional in structure and operation served by a steam line 40 controlled and pressure-supplied as will appear hereinafter.

The bore 36 extends downwardly through the housing 33 some distance past the passage 38 and is then radially expanded, approximately midway of the housing length, to form a compartment 41 with the upper end wall whereof said bore connects through a tapered shoulder constituting a conical valve seat, an inwardly-directed shoulder interrupting the length of said compartment serving to form a reduced-diameter well in the lower end thereof, which well, in turn, merges through a tapered shoulder at its lower end with and opens downwardly into a restricted throat 42 concentric with and operating as an extension of the bore 36. The throat 42 is relatively short vertically of the housing 33 and has its lower end expanded through a tapered shoulder into a radially somewhat larger compartment 43, which, after a relatively short, straight-walled, axial length, is abruptly radially expanded into a concentric chamber 44 of an axial length greater than that of the compartment 43, said chamber 44 being formed with a reduced-diameter, concentric lower end portion set off by means of an abrupt shoulder or ledge, and of a diameter greater than that of the compartment 43, which is closed by a centrally-apertured web 45 traversing and adjacent the lower end of the housing 33. Below the web 45, the housing 33 is extended a short distance downwardly as a sleeve 46 closable by means of an end cap 47, said sleeve and cap cooperating with said web to define a final housing compartment 48 concentric with the bores, chambers, compartments and throats hereinabove described.

Of an axial length sufficient to traverse the chamber 44 from the web 45 to the lower end of the compartment 43, and of a diameter slidably engageable within said compartment, an axially-elongate cup 49 is formed as a conical valve at its closed end, with a radially-exterior annular flange 50 about its open end, and is operatively housed within the chamber 44 with its open end directed downwardly against the web 45 and its closed end engaged just within the lower end of the compartment 43, the flange 50 of the cup 49 fitting slidably within the reduced-diameter lower end portion of said chamber, and is thereby mounted for reciprocation axially of said chamber and compartment between flange 50 engagement against the web 45 as a limit of its downward travel and seated engagement of its closed end conical valve against the tapered shoulder between the throat 42 and compartment 43 as a limit of its upward travel.

A headed stem 51 is reciprocably engaged through the central aperture of the web 45 with its upper headed end slidably received interiorly of the cup 49 and its lower headed end interiorly of the compartment 48, and an expansive coil spring 52 surrounds said stem interiorly of the cup 49 in bearing engagement between the web 45 and upper stem head to normally and yieldably urge said stem to the upward limit of its travel as determined by engagement of the stem lower end head against the web 45 under surface. The stem 51 upper head engages at times against the inner, upper end of the cup 49 so that the action of the spring 52 tends to elevate said cup toward the upper limit of its travel range, but the length of said stem is so proportioned to the cup depth and range of travel as to fall slightly short of seating said cup closed end valve against the coacting shoulder between the compartment 43 and chamber 44 when the said stem is spring-extended to its full upward travel limit. Obviously, downward displacement of the cup 49 to engagement of the cup flange 50 against the web 45 acts to compress the spring 52 and to correspondingly displace the stem 51 lower head downwardly within the compartment 48. Resting on the shoulder between the greater and lesser diameter portions of the chamber 44 and radially closing between the chamber greater diameter wall and the exterior surface of the cup 49, a freely-reciprocable ring 53 is yieldably held into engagement against said shoulder by an expansive coil spring 54 of less power than the spring 52 surrounding the cup 49 upper portion and bearing between the ring 53 upper surface and the upper end of the chamber 44. The ring 53 is thus resiliently held at the lower end of the chamber 44 greater diameter portion above and out of engagement with the cup flange 50 when the cup 49 is downwardly retracted against the pressure of the spring 52 and is positioned to be engaged and lifted upwardly of the chamber 44 against the pressure of the spring 54 by said flange when said cup is moved upwardly of the housing 33 toward seated reception of its upper end within the compartment 43; said spring 54 serving to urge said cup downwardly against the upper end head of the stem 51 and out of closing cooperation with its upper end valve seat while permitting full-range action of the spring 52, thereby positively establishing an adjusted position for said cup intermediate its travel range limits determined by the maximum upward projection of the stem 51, which adjusted position of the cup and associated elements is shown in the right-hand representation of Figure 4.

A rigid stem 55 fixedly interconnects in axial alignment with and between the valve 37 and cup 49 closed end in freely-traversing relation through the bore 36, compartment 41, throat 42 and compartment 43, said stem being of a size to leave an annular chamber thereabout within all of the cavities it traverses and of a length so proportioned to that of the housing 33 and disposition of the cavities therein as will serve to close the valve 37 against its seat in the lower end of the compartment 34 when the cup 49 is adjacent the lower limit of its range of travel and to fully open said valve 37 for flow of water from the passage 38 through the compartment 34 and nipple 35 when said cup is at the upper limit of its range of travel with its closed end valve seated against the tapered shoulder between the compartment 43 and throat 42. Within the bore 36 and below the passage 38, the stem 55 is formed or provided with a fixedly-associated, cylindrical boss 56 slidably cooperating with the wall of and disposed to obstruct said bore, and within the compartment 41 said stem is formed or provided with a fixedly-associated, somewhat larger, cylindrical boss 57 sized for telescopic reception within and to substantially fill the reduced-diameter, lower end well of said compartment, the ends of said boss 57 being formed as conical valves closable at times against the corresponding tapered shoulders of the compartment 41 ends, and the length and disposition of said boss 57 being so correlated with the length and relative location of the compartment 41 as to closably seat the boss lower end valve against the tapered shoulder between the compartment 41 and throat 42 when the valve 37 is closed and the cup 49 at the lower limit of its range of travel and to alternatively closably seat the boss upper end valve against the tapered shoulder between the bore 36 and compartment 41 when the valve 37 is fully open and the cup 49 at the upper limit of its range of travel.

The valve elements associated with and actuatable by the stem 55 within and for cooperation with the cavities and valve seats of the housings 33 function as pressure-loaded, automatically-responsive means for control of inflow to and outflow from the reservoirs 17 in accordance with the water needs of the boiler 10 as gauged by fluctuations of the boiler water level relative to the line L—L, the control assemblies serving the respective reservoirs being arranged for automatic, alternative, opposite positioning to maintain one of said reservoirs in feeding relation of its charge to the boiler and the other of said reservoirs in charging relation with the feed water supply line, and to alternate the stated reservoir relationship so as to at all times assure an available supply of feed water in pressure-balanced inflow relation with the boiler.

To energize and effectuate the purposes of the control valve assemblies, steam at boiler pressure is led from the boiler 10 or steam flow line 13 through a line 58, preferably equipped with a manually-actuatable flow control valve 59, to delivery interiorly of the compartments 41 of the housings 33, said line 58 being suitably branched for simultaneous maintenance of boiler steam pressure within each of the compartments 41 comprised in a particular operative assembly. For relief of certain pressures manifest internally of the housings 33, an exhaust or pressure outflow line 60 communicates through each housing 33 and with the compartment 43 thereof, said lines 60 of a given assembly conveniently intercommunicating for direction of their combined pressure outflow to any desired disposition. Adjacent the lower end of each bore 36 and just above the tapered shoulder between said bore and the compartment 41, a flow passage opens outwardly from said bore through the housing 33 wall for operative connection with the end of the steam line 40 serving the jet 39 of the inflow branch 31 in delivering relation with the other of said housings, so that, in each instance, a given jet 39 is energized by pressure flow through the control assembly of the housing 33 distinct from the one to which water inflow is stimulated by the action of the jet. The flow passages connecting between the bores 36 and lines 40 are so positioned relative to the movable valve assemblies of each housing 33 as to remain at all times in open communication with their respective bores, so that, as shown at the left of Figure 2, closing of the valve 37 and consequent seating of the boss 57 to close the upper end of the throat 42 arrests the boss 56 just above the inner end of the line 40 flow passage of the assembly and establishes a channel for steam pressure flow from the line 58 through the compartment 41 upper portion, lower end of the bore 36, flow passage and line 40, to the jet 39 serving the other assembly inflow branch 31, while full opening of the valve 37, as shown at the right of Figure 2, and consequent seating of the boss 57 to close the communication between the bore 36 and compartment 41 acts to close the channel just above traced and leaves the line 40 flow passage inoperatively connecting with a section of the bore 36 end-confined between the bosses 56 and 57.

Steam pressures from the control valve housing compartments 41 are automatically and selectively routed through suitable connections and means to actuate and position the valve elements 23 and 24 within and relative to their members 18, for which purpose a reversing valve assembly is provided in operative communication with the pressure flow lines 29 and 30 serving the said members 18. The reversing valve assembly is shown as a straight, closed, cylindrical casing 61 slidably accommodating a double-end spool valve 62 for limited reciprocation therein and axially thereof. A pressure flow line 63 operatively communicates through one end and with the interior of the casing 61, and a similar pressure flow line 64 operatively communicates through the other end and with the interior of said casing, said flow lines 63 and 64 being hence arranged to connect with and serve the casing chambers at the opposite ends of the valve 62. The line 63 connects with the angle port of a fitting 65 housing a pressure-responsive piston valve 66 shiftable to alternatively close the opposite ends of a flow passage through said fitting and correspondingly open a flow passage through the unclosed fitting end and fitting to said line 63, and a pressure flow line 67 operatively connects one end of said fitting flow passage with the throat 42 of one of the housings 33, while a separate flow line 68 operatively connects the other end of said fitting flow passage with the bore 36 of the other housing 33 just above the line 40 connection with said bore and in position to be obstructed and cut off by the boss 56 when the valve 37 of said housing assembly is closed against its seat. Similarly, and to function in cyclic opposition to the line 63, the line 64 connects with the angle port of a fitting 69 housing a piston valve 70, conveniently identical with the fitting 65 and valve 66, and a flow line 71 connects one end of the said fitting 69 flow passage with the throat 42 of the housing 33 serving the line 68, while a separate flow line 72 connects the other end of said fitting flow passage with the bore 36 of the housing 33 serving the line 67 just above the line 40 connection with said bore and in position to be obstructed and cut off by the boss 56 of said housing assembly when the valve 37 thereof is closed against its seat.

The spool valve 62 of the reversing valve assembly is arranged to shift from one end to the other end of the casing 61 in response to pressures alternately introduced to the opposite ends of said casing through the lines 63 and 64, for which functioning said valve 62 is formed with annular end flanges, desirably equipped with packing rings, peripherally and slidably engaging the cylindrical inner wall of the casing and cooperating with a reduced-diameter valve midportion to define an annular chamber thereabout in pressure separation away from the casing 61 end chambers. The valve 62 is formed with an axial bore 73 opening through valve seats in the opposite ends of the valve body and communicating through radial bores 74 with the annular chamber about the valve body midportion, and an auxiliary spool valve 75, of an operative length slightly greater than that of the axial bore 73, is reciprocably and loosely associated with said bore 73 to alternately engage against and close the said bore ends. The branched pressure flow line 29 serving one of the members 18 and the separate flow line 30 serving the other of said members connect through and with the interior of the casing 61 in position to be cleared by the adjacent end of the valve 62 when the latter is at one limit of its range of actuation, and the opposite branched line 29 and separate line 30 connect through and with the interior of said casing in position to be cleared by the other end of said valve 62 when the latter is at the opposite limit of its range of actuation, the said casing and valve being so proportioned and correlated with the casing-communicating ends of the lines 29 and 30 as to alternatively register one pair of the latter with the valve body 62 midportion annular chamber when the other such pair is in registration with a casing end chamber between a valve body end and adjacent casing end. Opening centrally through a wall of the casing 61, a pressure relief or exhaust line 76 is in flow communication at all times with the valve body 62 midportion annular chamber to maintain the interior of said chamber at approximately atmospheric pressure and to direct pressure exhaust from said chamber to any desired outlet or disposition.

If desired, and in accordance with conventional practice, a steam jet 77, served by an independent, boiler-fed steam line 78, may be operatively associated with and to stimulate water flow through the boiler water input line 12.

With steam at boiler pressure operatively present in and for flow through the lines 13, 13' and 58, the exhaust lines 60 and 76 open to atmosphere, and the valve 16 of the water supply line open to permit inflow of feed water to and through the branches 31, the cyclic operation of the assembly may be traced through its various phases from an initial operating condition determined by the dispositions and relationships of elements shown in Figure 2, wherein said elements are disposed and arranged for delivery of water from the left-hand reservoir 17 to the boiler and for charging inflow of water from the line 14 to the right-hand reservoir 17. As shown in said Figure 2, the valve assembly of the right-hand housing 33 is at the upper limit of its range of travel, thereby opening a water inflow passage from the associated branch 31 through the chamber 34 and nipple 35 to the right-hand reservoir interior, seating the boss 57 in closing relation with the bore 36 lower end, and seating the cup 49 closed end in closing relation with the throat 42 lower end, in which arrangement of elements the lines 68 and 40 connecting with said right-hand housing 33 inoperatively communicate with a section of the bore 36 closed between the bosses 56 and 57, communication through the line 69 and with said housing is closed off by the cup 49 upper end, and steam from the line 58 may enter the compartment 41 about the boss 57, traverse the lower portion of said compartment and the throat 42, enter and traverse the line 71 to displacement of the valve 70 in the fitting 69 into closing relation with the line 72, and flow through said fitting and line 64 into the end compartment of the casing 61 served thereby; the pressure reaction on the boss 57 and the inflow of water against the valve 37 under side cooperating to maintain the valve assembly of the right-hand housing 33 in its position of maximum elevation and against the downwardly-acting pressure of the spring 54.

Steam pressure introduced into the upper end of the casing 61 through the line 64 acts against the adjacent end of the spool valves 62 and 75 to close the upper end of the latter into sealing relation with the bore 73 and to move the valve assembly to the lower limit of its range of actuation and into uncovering relation with the end of the line 29 serving the left-hand member 18 and the end of the line 30 serving the right-hand member 18, so that steam pressure from the upper end chamber of the casing 61 may enter and traverse said lines. The lower end of the spool valve 75 being unseated from the corresponding end of the bore 73 when pressure is acting on the opposite valve assembly end, any pressure resistance to downward travel of the valve 62 is relieved by the opening of a passage from the casing 61 lower end chamber past the valve 75 lower end, through the bore 73 lower portion and bores 74 to the valve body annular chamber for exhaust through the line 76, and positioning of the valve 62 adjacent the lower end of the casing 61 disposes the end of the line 30 serving the left-hand member 18 and the end of the line 29 serving the right-hand member 18 in communication with the valve body annular chamber and exhaust line 76 opening thereinto, so that pressures obtaining between the elements 23 and 24 of said left-hand member and pressures existing between the outer ends of the right-hand member 18 and the adjacent element 23 and 24 ends may be relieved to atmosphere. Thus, steam pressure in the upper end chamber of the casing 61 is operative through the line 30 serving the right-hand member 18 to separate the elements 23 and 24 of said member and hold said elements at the outer limits of their range of reciprocation, there being no pressure resistance to such outward element travel, and in position to close off steam inlet from the branch 13' through the ports 19 to the right-hand reservoir 17 and water outlet from said reservoir through the ports 20 to the outflow line 21, while any pressure above atmospheric within said right-hand reservoir which might impede or nullify inflow of water to said reservoir through its nipple 35 is free to escape, as said reservoir fills, through the ports 19, and element 23 bores 25 and 27 and chamber 26, unseating the check valve ball 28, to the line 29 in communication with the exhaust line 76. At the same time, steam pressure in the upper end chamber of the casing 61 is operative simultaneously through both branches of the line serving the left-hand member 18 to move the elements 23 and 24 of said member to and to hold said elements at the inner limits of their reciprocatory range, there being no pressure resistance to such inward travel, and thereby open a passage from the steam branch 13' through the ports 19 to the interior of the left-hand reservoir, and to open a water passage through the ports 20 of said reservoir to the outflow line thereof and hence to the boiler 10; the steam pressure thus introduced interiorly of the said left-hand reservoir 17 balancing the boiler internal pressure so that outflow of said reservoir charge may continue until said reservoir is emptied or until the level of the reservoir charge coincides with the boiler water level. Transfer of water from the left-hand reservoir 17 to the boiler may be stimulated and expedited by activation of the jet 77, if desired. Boiler pressure acting interiorly of the left-hand reservoir 17 is effective through the reservoir charge, nipple 35, and compartment 34 to move the control valve assembly of the associated housing 33 to the lower limit of its range of actuation and to hold said assembly so positioned against the pressure of its spring 52 as long as boiler pressure is present in said reservoir, such boiler pressure acting against the valve 37 upper surface to seat said valve in closing relation with its bore 36 upper end, to dispose the related boss 56 in obstructing relation across the end of the line 72, to seat the boss 57 in closing relation with the upper end of the throat 42, and to space the closed end of the cup 49 downwardly away from the lower end of said throat, in which relation of elements the line 40 serving the jet 39 of the right-hand branch line 31 is placed in operative communication with the steam pressure line 58 through the compartment 41 and lower end of the bore 36, thereby activating said jet to stimulate water supply to the right-hand reservoir 17, and the valve 66 of the fitting 65 is in obstructing relation with the fitting end of the line 67 as a consequence of reactions incident to elevation of the right-hand housing 33 control valve assembly elevation.

The relationships of the elements remain as shown in Figure 2 and above described throughout the charging of the right-hand reservoir 17 and no alteration in the adjusted condition of the apparatus, other than lowering of the water level in the left-hand reservoir 17, occurs until the reservoir being charged is entirely filled.

As the water level within the right-hand reservoir 17 approaches said reservoir top end closure, some of the water passes through the ports 19 of the associated member 18 and enters the element 23 chamber 26 through the bores 27 and 25, the rise of water within said chamber lifting the floatable ball 28 and carrying said ball upwardly of said chamber 26 into seated relation against the upper chamber end and closing relation with the outer bore 25 portion, as shown in Figure 3. With the ball 28 closing off outflow through the bore 25 from the right-hand reservoir 17, as above described, there is no pressure relief passage from said reservoir and no outlet for the reservoir contents, so that continued inflow through the branch 31 and nipple 35 soon develops a pressure balance between the reservoir and inflow that arrests the latter and removes the inflow velocity acting against the under side and to maintain elevation of the valve 37, which valve, under the influence of gravity and the pressure of the spring 54, drops with the other elements of its control valve assembly to engagement of the cup 49 inner end against the upper head end of the stem 51 and to the position shown at the right of Figure 4, in which operative relationship with housing 33 and associated elements and connections said control valve assembly is momentarily retained by the pressure of the spring 52 acting to maintain the stem 51 at the upper limit of its reciprocatory range.

With the control valve assembly of the right-hand housing 33 in its intermediate position, as shown in Figure 4, the cup 49 upper end is retracted away from closing relation with the lower end of the adjacent throat 42 sufficiently to open a passage from the line 71 through said throat and the upper end of the compartment 43 to the exhaust line 60, the boss 57 is lowered to cooperation of its lower full-diameter end with the annular shoulder of the compartment 41 such as will substantially close off communication between the larger-diameter upper portion and the well of said compartment, which lowering of said boss opens the lower end of the bore 36 to establish a passage therethrough from the steam line 58 and upper portion of the compartment 41 to the lines 40 and 68, and the boss 56 is lowered to a point immediately above and out of obstructing relation with the opening serving the line 68. In the relationship of elements thus established interiorly of the right-hand housing 33, steam pressure flow from the line 58 enters and traverses the lines 40 and 68 of said housing to energize the jet 39 serving the left-hand water inflow branch 31 and, the valve 66 of the fitting 65 being in closing relation with the line 67 as a consequence of previous operations, to develop pressure through the line 63 within the lower end chamber of the casing 61 where said pressure is effective against the lower ends of the valves 62 and 75, a pressure relief passage now being open from the upper end chamber of said casing through the line 71, right-hand housing 33, and line 60, to seat the valve 75 lower end and open said valve upper end relative to the valve 62 and to shift the reversing valve assembly axially of the casing 61 to the upper limit of its range of actuation therein, as shown in Figure 4, which shift of the reversing valve assembly places the line 29 serving the left-hand member 18 and the line 30 serving the right-hand member 18 in pressure relief communication through the valve body annular chamber with the exhaust line 76 and opens paths of pressure flow from the casing 61 lower end chamber to and through the line 29 serving the right-hand member 18 and the line 30 serving the left-hand such member. Such reversal of the pressure conditions obtaining in the members 18 operates to reverse the dispositions of the valve elements 23 and 24 therein, the said elements 23 and 24 of the right-hand member 18 being pressure shifted to the inner limit of their range of reciprocation where they are pressure held to establish steam flow at boiler pressure from the branch line 13' through the ports 19 to the interior and against the water charge surface of the associated reservoir 17, and to open a passage for water outflow from said reservoir through the ports 20 and outflow line 21 thereof, while the elements 23 and 24 of the left-hand member 18 are simultaneously disposed at the outer limit of their range of reciprocation in position to obstruct inflow of steam pressure to and outflow of water from the interior of the associated reservoir 17 and to open a path for pressure relief from said reservoir interior through the ports 19, bores and chamber of the element 23, and line 29, to the exhaust line 76, thus conditioning the left-hand reservoir 17 for charging inflow of water and the right-hand reservoir for outflow delivery of its water charge to the boiler 10. In the showing of Figure 4, the reversing valve assembly has been fully actuated by virtue of the intermediate control valve assembly position in the right-hand housing 33, but the valve elements 23 and 24 of the members 18 are represented at an intermediate stage of their position reversal.

Shifting of the elements 23 and 24 responsive to elevation of the reversing valve assembly having been completed, said elements are then disposed as shown in Figure 5, the interior of the left-hand reservoir 17 has an outlet to atmosphere and the interior of the right-hand reservoir 17 is at boiler pressure, to which altered pressure conditions the respective control valve assemblies respond by moving to the operatively pertinent limits of their travel ranges. Under the pressure influence obtaining in the right-hand reservoir 17 and effective against the corresponding valve 37 upper surface, the control valve assembly of the right-hand housing 33 is moved downwardly against the pressure of its spring 52 and held in fully seated relation with its valve 37 closing the upper end of the bore 36, its boss 56 obstructing the line 68, and its boss 57 closing against the upper end of the throat 42, so that inflow from the branch 31 to the compartment 34 is inhibited, the steam line 58 is in operative communication with the line 40 serving the jet 39 of the left-hand supply branch 31, and the line 71 is in operative communication with the exhaust line 60, which disposition of elements corresponds exactly with the relationships obtaining in the left-hand housing 33 of Figure 2 and is characteristic of the control valve assembly adjustment conforming with water charge outflow from the associated reservoir. Relieved of the elevated pressures previously acting within its associated reservoir, the control valve assembly of the left-hand housing 33 is free to respond to the influence of its spring 52 and the inflow pressure acting from its branch 31 against the under side of the valve 37, whereby said control valve assembly is elevated to the upper limit of its travel range and there held against the pressure of the spring 54 in the disposition and relationship of elements shown at the left of Figure 5 and operatively duplicating the right-hand showing of Figure 2. As the left-hand control valve assembly moves up and its boss 56 clears the end of the line 72, communication is briefly established from the steam flow line 58, through the compartment 41 upper end and bore 36 lower end, to said line 72 with consequent shifting of the valve 70 in the fitting 69 and into closing relation with the line 71, thereby opening a passage for pressure relief from the adjacent line 40 and bore 36, by way of the line 72, 64, valve 75 and valve 62 annular chamber, to the exhaust line 76, and when said control valve assembly is in fully elevated position its valve 37 is fully open to inflow from the supply branch 31, through the compartment 34 and nipple 35, to the associated reservoir 17, its boss 57 is closed against the lower end of the bore 36, shutting off pressure flow from the line 58 to the lines 72 and 40 and establishing a path for pressure flow from said line 58 to the line 67 by way of the compartment 41 and throat 42, and the upper end of its cup 49 is closed against the throat 42 lower end to close off access to the exhaust line 60. Obviously, with the relationship of elements just described, steam pressure from the line 58 acts through the line 67 to shift the valve 66 of the fitting 65 into closing relation with the line 68, and through the line 63 to serve the lower end chamber of the casing 61 for maintenance of the reversing valve assembly and the elements 23 and 24 in the adjusted relationships shown in Figure 5, in which condition of adjustment the right-hand reservoir feeds its charge to the boiler and the left-hand reservoir fills with a fresh water charge until the floatable ball 28 is lifted to close the relief passage through the bore 25 and reinitiate the automatically-repetitive cycle.

When the apparatus is associated with and to feed water to intermittently-operated boilers, such as those of locomotives, and the like, or when for any reason operation of a boiler equipped with the improved apparatus is to be interrupted, the valve 59 controlling flow through the line 58 may be closed to arrest actuation of the feed apparatus during the boiler inactivity. However, instances have occurred when the drop of water level in a supposedly inactive boiler has resulted in unexpected and extensive damage, for which reason the improved apparatus is preferably provided with supplemental means, shown in Figures 1 and 6, automatically effective to reestablish operation of the apparatus at need and to by-pass the valve 59 when the water level of a working boiler becomes unduly low after flow through the line 58 has been shut off by means of said valve.

The supplemental means automatically operable after the valve 59 is closed to energize the boiler water feed apparatus in response to boiler water level drop includes a steam flow branch line 79 operatively connecting with the line 58 in by-passing relation about the valve 59, a fitting 80 defining a closable steam flow passage in said line 79 at the altitude of minimum permissible boiler water level, and a horizontally-reciprocable valve 81 associated with said fitting 80 to selectively open and close the steam passage therethrough. An actuating stem 82 fixed to the valve 81 is slidably received through and axially of one end of a housing 83 horizontally disposed in fixed relation with the fitting 80 at the minimum permissible boiler water level, and the end of said stem remote from the valve 81 fixedly connects with the movable end of a temperature-responsive, expansible and retractible element 84 within said housing and adjustably fixed thereto at its end remote from the fitting 80. A water flow line 85 connects the lower side of the housing 83 with the boiler 10 at a point below the minimum water level to be maintained therein, and a steam flow line 86 connects the upper side of said housing with the line 79, 58, or other supply of steam at boiler pressure, so that the water level of the boiler 10 is at all times reflected by a corresponding level of water in the housing 83. The element 84 is so constructed and adjusted in its mounted relation within the housing 83 as to contract and hold the valve 81 in closing relation with the flow passage through the fitting 80 when said element is submerged in and subject to the temperature of boiler water filling the said housing, and to expand axially with consequent passage-opening displacement of the valve 81 when steam from the line 86 is admitted to said housing as a result of boiler water level drop and corresponding withdrawal of water from the housing. Obviously, the valve 59 associated with an inactive boiler 10 being closed and the water level of said boiler being such as will fill the housing 83, the flow passage through the fitting 80 is obstructed by the valve 81 and operation of the water feed apparatus is arrested. However, should the boiler continue to work after its valve 59 is closed and to an extent such as lowers the boiler water level below the permissible minimum, water will be drawn away from the housing 83 and replaced by steam from the line 86 until, by virtue of the elevated steam temperature, the element 84 is expanded to open the passage through the fitting 80 and reestablish steam flow to and through the line 58, thus automatically reactivating the water feed apparatus to supply water to the boiler until the water level of the latter rises sufficiently to fill the housing 83, contract the element 84, and close the passage through the fitting 80.

The alternatively-employable housing 33 and associated control valve sub-assemblies shown in Figures 7, 8 and 9 are functional replacements for the analogous sub-assemblies shown in the preceding figures and hereinabove described, save that the alternative constructions provide for an initial pressure lift of each control valve assembly when the latter is conditioned to be shifted from water inflow closing to water inflow opening relation within its housing, and said alternative constructions cooperate with the remaining features and elements of the apparatus arranged as shown and described, in a somewhat modified manner hereinafter set forth, except that the use of the alternative constructions dispenses with the piston valves 66 and 70 of the fittings 65 and 69, respectively, and converts said fittings 65 and 69 into simple three-way flow line connections having no check-valve functions.

As shown in Figures 7, 8 and 9, the housings 33 of the previous disclosures are replaced by similar housings 33' furnished with compartments 34 and 41, throat 42, bore 36, and passage 38 in substantially the relationship earlier described and operatively mounting control valve assemblies including the elements 37, 55, 56 and 57 in a unitary arrangement comparable to that initially set forth. In a structural sense, the housings 33' differ from the housings 33 in that the bore 36 of the former is elongated somewhat relative to that of the latter, the exhaust line 60 connects with the bore 36 of the housing 33' somewhat below the passage 38 thereof, the compartment 41 of the housing 33' opens directly into the throat 42 rather than through a reduced-diameter well portion, the compartment 43 and chamber 44 of the housing 33 are dispensed with to bring the apertured web 45 into closing relation across the lower end of the housing 33' throat 42, and the sleeve 46 is extended to an axial length greater than that obtaining in the housing 33 arrangement. The control valve assembly of the housing 33' is modified by the addition of a concentric, cylindrical, downward extension 87 on the under side of the valve 37 sized to telescopically fit within the upper end of the bore 36 when said valve is closed to its seat against said bore end, by an extension 88 on the under side of the boss 57, similar to the extension 87, adapted to telescopically fit within the upper end of the throat 42 when said boss is closably seated thereagainst, by a cylindrical boss 89, similar to the boss 56, fixed to the stem 55 between the boss 56 and passage 38 and slidably cooperating with the bore 36 to close off flow access from said bore to the line 60 when the valve 37 is seated against the bore end and to open flow access from said bore to said line 60 when said valve is partially or fully open, and by the substitution for the cup 49 of a reduced-diameter, axially-coincident finger 90 on and connecting through a shoulder with the lower end of the stem 55. The spring 52 of the housing 33' is housed within the sleeve 46 and bears at one end against the cap 47 to yieldably urge a centrally-apertured washer 91, slidable within said sleeve, upwardly against the under side of the web 45, and the aperture of said web is sized to slidably accommodate the lower end of the stem 55 while the washer 91 aperture slidably accommodates the finger 90 but not the stem lower end. With the housings 33' and modified control valve assemblies arranged as shown and described, the steam flow line 58 of the apparatus connects with and simultaneously serves the compartments 41 of the paired housings, a line 40 connects with the bore 36 lower end of each housing to serve the jet 39 of the opposite sub-assembly, the line 72 on the left and the line 68 on the right connect with their respective housing bores just above the lines 40, the line 67 on the left and the line 71 on the right connect with their respective housing bores 36 in spaced relation above the corresponding lines 72 and 68, the inflow branches 31 connect with their respective passages 38, nipples 35 connect the housing compartments 34 with the associated reservoirs 17, a branch flow line 92 communicates between the line 67 and the lower end of the left-hand housing throat 42, and a similar branch flow line 93 communicates between the line 71 and the lower end of the right-hand housing throat 42. For proper functional cooperation within the sub-assemblies as so connected and arranged, the control valve assembly elements are spaced and adjusted in axial length substantially as shown, in which relation seated engagement of the valve 37 against the upper end of its bore 36 (Figure 7) telescopes the valve extension 87 within the bore upper end, positions the boss 89 in obstructing relation with the line 60 and the boss 56 in obstructing relation with the line 72 (68) between the uncovered lines 67 (71) and 40, closes the boss 57 against the upper end of the throat 42 with its extension 88 telescoped within said throat, and slidably extends the stem 55 lower end through the web 45 aperture to depress, by virtue of its shoulder engagement therewith, the washer 91 downwardly away from said web against the pressure of its spring 52. At the other extreme of control valve assembly travel (Figure 8), the valve 37 is elevated away from its seat sufficiently to clear the extension 87 from the bore 36 and open an inflow passage from the line 31, the boss 89 obstructs said bore between the now open line 60 and passage 38, the boss 56 obstructs the line 71 (67), the lines 68 (72) and 40 are now open to the bore 36 between the bosses 56 and 57 and inoperative because the upper end of the boss 57 is closed against the lower end of said bore, the extension 88 is elevated out of and away from the throat 42 to open a steam pressure flow passage from the line 58, through the compartment 41, throat 42 and branch line 93 (92) to the line 71 (67), the washer 91 is held by its spring 52 against the under side of the web 45, and the shoulder between the finger 90 and stem 55 lower end is held by the forces acting upon the control valve assembly in upwardly spaced relation with the web 45 upper side. Assuming substitution of the sub-assemblies of Figures 7 and 8 for the left- and right-hand analogous units, respectively, of the assembled apparatus, the control valve assembly dispositions of said Figures 7 and 8 determine a functional relationship of the other apparatus elements corresponding with the showing of Figure 2, a pressure flow path effective to hold the reversing valve assembly at the lower end of the casing 61 being open through the right-hand housing 33' from the line 58, through the lines 93, 71 and 64, to the upper end chamber of said casing, escape of pressure through the line 72 and lower end of the line 71 being blocked off by the respective bosses 56, the lines 67, 92 and 68 being "dead-ended," and a pressure relief passage being open through the reversing valve assembly from the casing 61 lower end chamber to the line 76, in which relation of the said reversing valve assembly the left-hand reservoir 17 is conditioned for delivery of its water charge to the boiler 10 and the right-hand reservoir 17 is conditioned to receive and accumulate water inflow from the supply line. Obviously, position reversal of the control valve assemblies of Figures 7 and 8 results in a functional disposition of the apparatus elements corresponding with that shown in Figure 5 and a consequent reversal of the reservoir 17 functions.

The modified control valve assemblies of the housings 33' are each arranged, comparably to the analogous assemblies of the housings 33, to pass through and be momentarily arrested with functional significance at an intermediate positions as the shift from inflow fully open to inflow fully closed adjustment is made in response to a condition of pressure balance between the operative inflow line and the interior of the reservoir being charged thereby, the functional relationships established by such control valve assembly intermediate position being typified by the showing of Figure 9. In the same manner as has been previously explained, complete filling of a reservoir 17 under charge through a fully elevated control valve assembly (Figure 8) results in a pressure rise within the filled reservoir which ultimately equals the inflow pressure and checks the inflow velocity, permitting a gravity-induced drop of the pertinent control valve assembly. With the modified sub-assemblies according to Figures 7, 8 and 9, the control valve assembly drop resulting from the check of inflow velocity is limited by engagement of the shoulder at the stem 55 lower end against the washer 91 in its spring-maintained contact against the web 45 lower side, which limitation serves to initially enter the extensions 87 and 88 in and to respectively close upper ends of the associated bore 36 and throat 42, places the line 67 (71) in communication through the bore 36 between the bosses 56 and 89 with the exhaust line 60, opens the lines 72 (68) and 40 to steam pressure flow from the line 58 through the compartment 41 and now open lower end of the bore 36, interrupts steam pressure flow from the compartment 41 to the throat 42, and connects the lower end of said throat to exhaust 60 through its branch 92 (93) and line 67 (71), full closing of the control valve assembly being a function of boiler pressure application to the associated reservoir after shift of the reversing valve assembly, as previously explained. Halted in its intermediate position, the control valve assembly in progress from inflow open to inflow closed relation with its housing 33' is operatively coordinated with and to facilitate initial elevation of the pressure-seated control valve assembly of the paired housing 33' when the reversing valve assembly has been shifted to relieve such pressure. Assuming the control valve assembly of Figure 8 dropped to the intermediate position typified by Figure 9 and the control valve assembly of Figure 7 closed as shown, piston valves 66 and 70 having been removed from the fittings 65 and 69, steam pressure flow from the line 58 to the line 93 is cut off at the upper end of the throat 42 and a pressure relief passage is opened from the lower end of said throat through said line 93 and the lower end of the line 71 to the exhaust line 60 of Figure 8, and at the same time a pressure relief passage is established from the upper end chamber of the casing 61 through the lines 64 and 71 to said line 60 of Figure 8, the line 72 being obstructed by the boss 56 of the other assembly. Simultaneously, steam pressure flow from the line 58 into the compartment 41 of Figure 8 enters and acts through the lines 40 and 68 to energize the jet 39 of the paired assembly and, by way of the line 63, to shift the reversing valve assembly, during which operative phase steam pressure flow from said line 68 passes through the open fitting 65, line 67, and branch 92, into the lower end of the Figure 7 throat 42, the corresponding end of the line 67 being "dead-ended" between the bosses 56 and 89, where said pressure acts between the web 45 and lower end of the extension 88 to lift the control valve assembly of Figure 7 when pressure acting against the upper face of the valve 37 thereof has been relieved. The reversing valve assembly having shifted to fully close and seat the control valve assembly of Figure 8 and to permit full elevation of the control valve assembly of Figure 7, exhaust lines 60 are closed off from flow cooperation with any other lines of the apparatus, line 68 is obstructed, and pressure flow from the line 58 of Figure 7 acts through the throat 42 thereof, line 92 and line 67 to maintain the reversing valve assembly in its shifted position until the charging reservoir has been filled.

It is within the contemplation of the invention that other alternative, supplementary, and additional means, electrical, pneumatic, hydraulic, magnetic, or mechanical, may be availed of for the positive and automatic shifting and positioning of the control valve assemblies to give effect to the operative principles of the improvement, and that various modifications in the form, construction, and arrangement of the elements shown and described may be had without departing from the spirit of the invention, hence I wish to be understood as being limited solely by the scope of the appended claims, rather than by any details of the illustrative showing and foregoing description.

I claim as my invention:

1. A boiler water feed device comprising, duplicate, separate, feed water reservoirs disposed for coplanar relation of their minimum contents level with the desired boiler water level, steam and water flow lines communicating between each of said reservoirs and the boiler to be served, means for inflowing feed water to each of said reservoirs, pressure-actuatable means selectively positionable in flow-controlling relation with the steam and water lines serving each reservoir, pressure-flow-controlling means effective to oppositely position the pressure-actuatable means of the respective reservoirs for simultaneous boiler feed water outflow from one and supply water inflow to the other thereof, and means reactive to reservoir interior pressure rise incident to attainment of full water charge in either reservoir and apart from increase in the charge head for automatically reversing the disposition of said pressure-actuatable means.

2. A boiler water feed device comprising, duplicate, separate, feed water reservoirs disposed for coplanar relation of their minimum contents level with the desired boiler water level, steam and water flow lines communicating between each of said reservoirs and the boiler to be served, means for inflowing feed water to each of said reservoirs, flow-control means pressure actuatable between open and closed relation with the steam and water lines serving each reservoir, means automatically correlating the disposition of said flow-control means to maintain one of said reservoirs in pressure-balanced, gravity-flow relation with the boiler and the other reservoir in charging relation with its inflow means, and reservoir interior pressure reactive means effective to reverse the disposition of said flow-control means in response to pressure variations apart from those of the charge head.

3. A boiler water feed device comprising, duplicate, separate, feed water reservoirs disposed for coplanar relation of their minimum contents level with the desired boiler water level, a steam inflow and a water outflow line communicating between each of said reservoirs and the boiler to be served, flow-control means simultaneously pressure actuatable between open and closed relation with said lines to alternatively relate the associated reservoir for pressure-balanced outflow of its charge to the boiler and for pressure-vented flow isolation from the boiler, a supply water inflow serving each reservoir, a valve assembly reactive to associated reservoir interior pressures actuatable between open and closed relation with each said inflow line, steam pressure circuits effective to synchronously actuate the flow-control means of each reservoir in maintained relation such as opposes flow disposition of the inflow valve to that of the outflow and steam line controls, a reversing valve in said circuits for correlating the flow-control means of the separate reservoirs to automatically maintain one reservoir in charging relation with its inflow line and the other reservoir in supplying relation with the boiler, and steam circuit controls in said valve assemblies effective to shift said reversing valve coincidentally with shift of said assemblies for automatic reversal of reservoir flow relationship.

4. In a boiler water feed device having duplicate, separate, feed water reservoirs disposed for coplanar relation of their minimum contents level with the desired boiler water level, feed water inflow lines, boiler supply water outflow lines, and steam pressure lines communicating with each reservoir, pressure-responsive means in flow-controlling relation with the lines serving each reservoir, a pressure system for actuation of said means correlated to maintain one of said reservoirs in pressure-balanced, gravity-flow relation with the boiler and the other reservoir in charging relation with its inflow line, and means reactive to reservoir interior pressures beyond the charge head consequent upon maximum reservoir charge effective through said pressure system to automatically reverse the reservoir flow relationship.

5. In a boiler water feed device having duplicate, separate, feed water reservoirs disposed for coplanar relation of their minimum contents level with the desired boiler water level, feed water inflow lines, boiler supply water outflow lines, and steam pressure lines communicating with each reservoir, pressure-shiftable valves in flow-controlling relation with the lines serving each reservoir, a pressure system in actuating relation with said valves correlated to automatically maintain one of said reservoirs in pressure-balanced, gravity-flow relation with the boiler and the other reservoir in charging relation with its inflow line, means in said system shiftable to reverse the reservoir flow relationship, and means reactive to reservoir interior pressures beyond the charge head consequent upon maximum reservoir charge to shift said first means.

6. In a boiler water feed device having duplicate, separate, feed water reservoirs disposed for coplanar relation of their minimum contents level with the desired boiler water level, feed water inflow lines, boiler water supply outflow lines, and steam pressure lines communicating with each reservoir, pressure-shiftable valves in flow-controlling relation with the lines serving each reservoir, a pressure system in actuating relation with said valves arranged to maintain the inflow control valve of each reservoir disposed for flow conditioning opposite to that of the associated outflow and steam line valves, means in said system for automatically maintaining the corresponding valves of the separate reservoirs in opposite positions of flow regulation with one reservoir conditioned for inflow of charge thereto and the other reservoir pressure-balanced in gravity-flow relation with and for outflow of its charge to the boiler, and means reactive to attainment of maximum reservoir charge to reverse the reservoir flow relationship.

7. In a boiler water feed device having duplicate, separate, feed water reservoirs disposed for coplanar relation of their minimum contents level with the desired boiler water level, a feed water inflow line serving each reservoir, a pressure-shiftable valve in flow-controlling relation with each inflow line, a boiler water supply outflow line and a steam pressure line serving each reservoir, pressure-shiftable valves in flow-controlling relation with said outflow and steam lines, means normally urging each inflow line valve to open, reservoir-charging position and yieldable to rise of pressure in the associated reservoir with consequent inflow-interrupting closure of the valve, a pressure system serving all said flow-control valves, means in said system responsive to the dispositions of the inflow line valves to hold the corresponding outflow and steam line valves in flow control with their respective lines opposite to that of the inflow line valve, whereby the reservoir conditioned for charge inflow is vented to atmosphere and closed away from charge outflow and steam inflow and the reservoir conditioned for outflow is closed away from communication with atmosphere and charge inflow and is opened to steam pressure and charge outflow in pressure-balanced, gravity-flow relation with the boiler, means responsive to attainment of maximum charge for closing the vent from the charging reservoir, and means reactive to rise of reservoir interior pressure incident to such vent closing effective through the pressure system to shift the flow-control valves and reverse the reservoir flow relationship.

8. In a boiler water feed device having duplicate, separate, feed water reservoirs disposed for coplanar relation of their minimum contents level with the desired boiler water level, a feed water inflow line serving each reservoir, a pressure-shiftable valve assembly in normally-open, flow-controlling relation with each inflow line and automatically closable to interrupt the inflow in response to pressure rise in the associated reservoir, a boiler water supply outflow line and a steam pressure line serving opposite ends of each reservoir, pressure-shiftable valves in flow-controlling relation with said outflow and steam lines, a pressure system including a reversing valve serving the steam and outflow line control valves of both reservoirs and arranged to maintain the said valves in an associated reservoir in like flow control disposition opposite to that of the corresponding valves in the other reservoir and to vent to atmosphere the interior of the reservoir closed against steam inflow and charge outflow, reversing valve shifting means reactive to the positions of the inflow control valves to position said reversing valve for closing of the steam and outflow line control valves of the reservoir whereof the inflow control valve is open and to open the steam and outflow line control valves of the reservoir whereof the inflow control valve is closed, and means automatically effective at reservoir maximum charge to close the charging reservoir vent to atmosphere and additional means responsive to the consequent rise of reservoir water pressure operate the corresponding inflow valve assembly into a position to shift the reversing valve.

9. In a boiler water feed device having duplicate, separate, feed water reservoirs disposed for coplanar relation of their minimum contents level with the desired boiler water level, a steam pressure line and a supply water outflow line communicating between each reservoir and the boiler, valves simultaneously pressure-shiftable to alternatively open and close flow communication through the steam and outflow lines of each reservoir, a pressure system operatively serving said valves, a pressure-shiftable reversing valve in said system for the alternative direction of pressure flow to hold open the steam and outflow line valves of one reservoir and to hold closed the said valves of the other reservoir, inflow lines serving said reservoirs, valve assemblies responsive to associated reservoir interior pressure in flow-controlling relation with said inflow lines, vent means for automatically relieving interior pressure of each reservoir when the steam and outflow line valves thereof are closed, a pressure supply line serving said reversing valve through said inflow valve assemblies, said valve assemblies including elements in and shiftable therewith for control of pressure flow to said reversing valve and consequent positioning of the latter to condition one reservoir for inflow of charge and the other reservoir for pressure-balanced outflow of its charge to the boiler, means responsive to attainment of full inflow charge for closing the vent from the charging reservoir and means reactive to water pressure rise consequent upon such vent closing for shifting the open inflow valve assembly with consequent reversal of pressure flow to and shifting of the reversing valve.

10. In a boiler water feed device having duplicate, separate, feed water reservoirs disposed for coplanar relation of their minimum contents level with the desired boiler water level, steam and water flow lines between each of said reservoirs and the boiler to be served, simultaneously-actuatable, pressure-shiftable valves correspondingly controlling flow through said lines of each reservoir, pressure flow lines serving said valves, means for the inflow of feed water to each of said reservoirs, and a normally-open, pressure-closable valve assembly for controlling flow through each said inflow means, means automatically operable to correlate the positions of said valves and valve assemblies to maintain one of said reservoirs in charging relation with its inflow means and the other reservoir in pressure-balanced, gravity-flow, supplying relation with the boiler and to reverse the reservoir flow relationship in reaction to attainment of maximum charge within the charging reservoir, said automatically operable means comprising a pressure system including and operatively correlating said pressure flow lines to simultaneously open the pressure-shiftable valves of one and to close the said valves of the other reservoir, a reversing valve in said system, pressure supply lines serving said reversing valve and system, means in and shiftable with each inflow control valve assembly for the control of flow through said pressure supply lines, means in the pressure-shiftable valves effective to vent each reservoir interior to atmosphere when the steam and outflow lines thereof are closed, and means reactive to attainment of full reservoir charge for blocking said vent with consequent pressure rise in the associated reservoir effective on and to close the associated valve assembly.

11. Apparatus as set forth in claim 10, wherein said pressure system includes a valve-closing pressure flow line and a separate valve-opening pressure flow line for each reservoir and provides for common communication between the valve-closing pressure flow line of one reservoir and the valve-opening pressure flow line of the other reservoir, operatively-separate connections between said so-communicating, operatively-paired lines and the pressure supply through said reversing valve, and means in said reversing valve for automatically venting to atmosphere the so-communicating pair of lines isolated from the pressure supply.

12. Apparatus as set forth in claim 10, wherein said reversing valve comprises a closed housing, a spool-type member sealably cooperating within and shiftable from end to end of said housing to alternately define chambers at the opposite ends of the latter, means for connecting each of said alternately-definable housing end chambers simultaneously with operatively-opposite pressure flow line elements serving the pressure-shiftable valves of the separate reservoirs, a vent to atmosphere centrally of said housing, an annular chamber centrally about and between the ends of said shiftable member in constant communication with said vent and for alternate communication with the paired flow lines remote from an established housing end chamber, and means for connecting the opposite ends of said housing to said pressure supply lines the selective delivery of pressure supply thereinto.

13. Apparatus as set forth in claim 10, wherein the means in the inflow control valve assembly for the control of pressure supply flow to the reversing valve and pressure system comprises a valve assembly housing reciprocably accommodating the valve assembly stem, a chamber in said housing traversed by said stem, a pressure supply line disposed for delivery to said chamber, valve seats at the opposite ends of said chamber, a valve body on said stem for closing cooperation with the upper of said seats when the inflow valve is open and with the lower of said seats when the said inflow valve is closed, bores in said housing intersecting said seats to establish oppositely-extending, alternatively-open, flow passages from said chamber, a connection between the upper of said bores and a pressure system element serving one side of the reversing valve, a connection between the lower of said bores and a pressure system element serving the other side of the reversing valve, the pressure system element connections of the separate housings being oppositely disposed, and a slide block on said stem in spaced relation with said valve body to obstruct access to the pressure flow line connecting with the upper bore when the inflow valve is closed; whereby open condition of the inflow valve establishes pressure flow through the chamber and lower bore to one side of the reversing valve, closed condition of the inflow valve interrupts all pressure flow through its housing to the reversing valve, and partially-closed inflow valve condition establishes a flow passage through the chamber and upper bore to the reversing valve side opposite to that served by the lower bore connection.

14. Apparatus as set forth in claim 10, wherein the means for venting reservoir interiors to atmosphere comprises a pressure flow line element disposed to effect shift of the steam flow controlling, pressure-shiftable valve of each reservoir to open steam flow thereinto, said element being exhausted to atmosphere when its associated valve is closed to obstruct steam flow, a passage in said associated valve disposed to connect between the reservoir interior and said pressure flow line element when the said valve is closed, a chamber in said valve traversed by said passage, and a check valve in said chamber effective to pass vapor and to obstruct water outflow from the reservoir and to said flow line element and to obstruct inflow from said element and to said reservoir.

15. Apparatus as set forth in claim 10, wherein the means reactive to attainment of full reservoir charge for blocking reservoir vent to atmosphere comprises an outflow passage communicating between the reservoir interior upper portion and a line open to atmosphere while the reservoir is charging, a vertically-disposed chamber enlargement traversed by said passage, a downwardly-diverging valve seat at the junction of said passage and chamber upper end, and a floatable valve element in said chamber cooperable with and to close against said valve seat for obstruction of said passage when elevated into contact therewith by charge water entering said passage and chamber.

THOMAS N. PINION.

REFERENCES CITED

The following references are of record in the file of this patent:

UNITED STATES PATENTS

| Number | Name | Date |
|---|---|---|
| 764,988 | Castillo | July 12, 1904 |
| 1,601,478 | Oswald | Sept. 28, 1926 |